(12) United States Patent
Wong

(10) Patent No.: US 7,742,636 B2
(45) Date of Patent: Jun. 22, 2010

(54) METHOD AND APPARATUS FOR SCALING DOWN A BAYER DOMAIN IMAGE

(75) Inventor: Ping Wah Wong, Sunnyvale, CA (US)

(73) Assignee: Nethra Imaging Inc., Santa Clara, CA (US)

( * ) Notice: Subject to any disclaimer, the term of this patent is extended or adjusted under 35 U.S.C. 154(b) by 838 days.

(21) Appl. No.: 11/341,712

(22) Filed: Jan. 26, 2006

(65) Prior Publication Data

US 2007/0172117 A1  Jul. 26, 2007

(51) Int. Cl.
G06T 3/40 (2006.01)
(52) U.S. Cl. .................. 382/162; 382/298; 345/660
(58) Field of Classification Search .......... 382/298, 382/299, 162; 345/660; 348/581; 358/451
See application file for complete search history.

(56) References Cited

U.S. PATENT DOCUMENTS

2003/0103058 A1*  6/2003  Elliott et al. ............. 345/589
2003/0223649 A1*  12/2003  Findlater et al. ........... 382/298
2003/0231247 A1*  12/2003  Watanabe ................. 348/222.1
2004/0201721 A1*  10/2004  Baharav et al. ........... 348/222.1

* cited by examiner

Primary Examiner—Jon Chang
(74) Attorney, Agent, or Firm—Hahn & Moodley LLP; Vani Moodley, Esq.

(57) ABSTRACT

In one embodiment of the invention, a method is provided. The method, comprises scaling down a Bayer domain image made up of a number of 2×2 basic units, each having a Red (R) pixel, a Blue (B) pixel, and two green (G) pixels arranged in a fixed configuration and replicated throughout the image, the method comprising (a) partitioning the image into 2M×2N input blocks, where M and N are integers greater than or equal to 1; (b) for each 2M×2N input block, averaging a selection of R pixels in the block to produce a R pixel in a scaled down image corresponding to the Bayer domain image; (c) averaging a selection of B pixels in the block to produce a B pixel in the scaled down image; and (d) partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

24 Claims, 13 Drawing Sheets

| R | G | R | G | R | G | R | G |
|---|---|---|---|---|---|---|---|
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |
| R | G | R | G | R | G | R | G |
| G | B | G | B | G | B | G | B |

*FIGURE 1*

METHOD AND APPARATUS FOR SCALING DOWN A BAYER DOMAIN IMAGE

FIELD

Embodiments of the invention relate to a method and apparatus for scaling down a Bayer domain image.

BACKGROUND

In digital image capture systems such as digital cameras, an image sensor captures image data, and the image data are processed by a sequence of image processing procedures arranged in an imaging pipeline to give the desired output color images. Typical image sensors use a color filter array arranged in a mosaic pattern to capture one primary color (R, G or B) per pixel. An example 16×16 Bayer color filter array 10 is shown in FIG. 1 of the drawings. For typical image sensors consisting of millions of pixels, one of the four 2×2 basic units or blocks of pixels are possible, as is shown in FIG. 2 of the drawings, is replicated throughout the entire sensor, where the basic blocks are indicated by reference numerals 12 through 18. The symbols G1 and G2, both representing green, are used for the purpose of specifying their relative location within the 2×2 basic block.

A demosaicing procedure is used in the imaging pipeline to convert the mosaic data into full color image data where complete RGB values are specified at each pixel location. Generally, the steps before the demosaicing step are referred to as being in the Bayer domain, and the steps after the demosaicing step are referred to as being in the RGB domain.

In many imaging applications, the actual required output size of the image could vary. Consider an example of a digital camera with a sensor of 1600×1200 pixels. When the camera operates in normal capture mode, the full size image is captured and sent to a storage device, or to an external system such as an image printer or a computer. When the camera operates in the preview mode, an image is processed and sent to a preview screen to be displayed, which could have a size of, e.g. 320×240 pixels. In this case, the image will need to be spatially scaled down at some point within the imaging pipeline.

Many image sensors support a decimation mode where rows and columns of the sensor data are skipped in the read-out process so that the image read from the sensor is only at a fraction of the sensor resolution or size. A disadvantage of using sensor decimation is that this process usually affects the frame rate, i.e. the number of images per unit time. When a user wants to capture an image, the system is switched from preview to capture mode. In this case, it would be necessary to set the sensor read-out mode back to full resolution. This causes a change in frame rate, and as a result the sensor exposure parameters would have to be adjusted to account for the frame rate change. This can cause a delay in image capture because image sensors take time to settle down when the sensor exposure parameters are changed.

An alternative approach is to keep the sensor read-out resolution constant, and scale down the input image at the front end of the imaging pipeline, i.e. perform scale down immediately after the image data are received at the imaging pipeline. This approach maintains a constant frame rate and hence significantly simplifies exposure control and delay in the system. Similar to the sensor decimation approach, the image size is reduced at the front end of the pipeline and hence power consumption of the image processor can be minimized.

One technique for scaling down an image in the Bayer domain is decimation or sub-sampling. FIG. 3 shows an example of decimation by a factor of 4. Referring to FIG. 3, an input Bayer domain image 20 having a resolution of 16×16 is scaled down to produce an output image containing 4×4 pixels. To produce the image 22, the image 20 is processed horizontally (from left to right) such that pixels from two consecutive columns are retained, and the next 6 are dropped, and so on. Similarly, the image 20 is processed in the vertical direction (from top to bottom) such that pixels from two consecutive rows are retained, the next 6 rows are dropped, and so on. The result is the image 22 where each of the horizontal and vertical dimensions is reduced by a factor of 4, with the output image having the exact same mosaic arrangement as the input image 20.

In the general case of decimation by $2^K$ (vertical) and $2^L$ (horizontal) for integers K and L (K and L do not need to have the same value), the procedure follows an alternating pattern of retaining pixels in the first two rows, skip the next $2^{K+1}-2$ rows, retain the next two rows, skip the next $2^{K+1}-2$ rows, and so on. A similar procedure is performed in the horizontal direction where one follows an alternating procedure of keeping 2 columns and dropping the next $2^{L+1}-2$ columns.

Another technique for decimation includes smoothing or averaging. Consider the case of decimation with factors $2^K$ (vertical) and $2^L$ (horizontal). In this case, the image is partitioned into tiles of size $2^{K+1}$ and $2^{L+1}$. Each output pixel in the output image is given by an average of all the pixels of the same color within a $2^{K+1}$ and $2^{L+1}$ tile. FIG. 4 shows an example where K=L=2. Here $R_{avg}$ is the weighted average of the 16 R pixels, $G1_{avg}$ is the weighted average of 16 G1 pixels, and so on. The size of the kernel (the number of pixels included in the averaging) and the weights for each pixel can be optimized according to a number of criteria such as the degree of smoothing. The above technique is akin to linear filtering since weighted averaging is equivalent to the convolution procedure in filtering.

While the second decimation technique described above is an improvement to the first decimation technique described above, in terms of the smoothness of the output image, the second decimation technique suffers from the problem described below with reference to FIG. 4 of the drawings. Referring to FIG. 4, a Bayer domain input image 24 is scaled down to an output image 26. The down scaling factor is 1:4 horizontally and vertically, and each output pixel in the output image 26 shown essentially covers an area of 4×4 pixels in the input image 24. Note that both G1 and G2 are green pixels. They are only labeled (named) differently because of traditional hardware arrangements in image sensors. The G1 and G2 pixels may go through different processing circuits in the image sensor and hence would have minor differences between them, but they are still pixels giving color information on the same primary color within the neighborhood. It will be appreciated that the weighted averaging in FIG. 4 is sub-optimal because, e.g., the G1 pixel 28 near the lower left corner of the input image is spatially much closer to the $G2_{avg}$ pixel 30 in the output image than to the $G1_{avg}$ pixel 32 in the output image.

SUMMARY

According to a first aspect of the invention, there is provided a method for scaling down a Bayer domain image made up of a number of 2×2 basic units, each having a Red (R) pixel, a Blue (B) pixel, and two green (G) pixels arranged in a fixed configuration and replicated throughout the image, the method comprising (a) partitioning the image into 2M×2N input blocks, where M and N are integers greater than or equal to 1; (b) for each 2M×2N input block, averaging a selection of R pixels in the block to produce a R pixel in a scaled down image corresponding to the Bayer domain image; (c) averaging a selection of B pixels in the block to produce a B pixel in the scaled down image; and (d) partitioning the 2N×2N input block into first and second triangular regions, and averaging a selection of pixels in the first triangular region to produce a first G pixel in the scaled down image, and averaging a selection of pixels in the second triangular region to produce a second G pixel in the scaled down image.

According to a second aspect of the invention, there is provided a method for processing a Bayer domain image to produce a scaled down image comprising a repeating pattern of a 2×2 basic pixel block having four color pixels, the method comprising (a) defining an area of support for each color pixel of each 2×2 basic pixel block in the scaled down image, each area of support including pixels of the Bayer domain image that are spatially related to the color pixel; and (b) generating each color pixel for each 2×2 basic pixel block in the output image by averaging a selection of pixels of the Bayer domain image within the area of support for the color pixel.

According to a third aspect of the invention there is provided an image processor, comprising a central processing unit (CPU) core; and a scaling engine coupled to the CPU core, the scaling engine capable of performing a method of scaling down a Bayer domain image made up of a number of 2×2 basic units, each having a Red (R) pixel, a Blue (B) pixel, and two green (G) pixels arranged in a fixed configuration and replicated throughout the image, the method comprising (a) partitioning the image into 2M×2N input blocks, where M and N are integers greater than or equal to 1; and (b) for each 2M×2N input block, averaging a selection of R pixels in the block to produce a R pixel in a scaled down image corresponding to the Bayer domain image; (c) averaging a selection of B pixels in the block to produce a B pixel in the scaled down image; and (d) partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

According to a fourth aspect of the invention, there is provided an image processing system, comprising an image sensor; and an image processor to process data from the image sensor, the image processor comprising a central processing unit (CPU) core; and a scaling engine coupled to the CPU core, the scaling engine capable of performing a method of scaling down a Bayer domain image made up of a number of 2×2 basic units, each having a Red (R) pixel, a Blue (B) pixel, and two green (G) pixels arranged in a fixed configuration and replicated throughout the image, the method comprising (a) partitioning the image into 2M×2N input blocks, where M and N are integers greater than or equal to 1; and (b) for each 2M×2N input block, averaging a selection of R pixels in the block to produce a R pixel in a scaled down image corresponding to the Bayer domain image; (c) averaging a selection of B pixels in the block to produce a B pixel in the scaled down image; and (d) partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

According to a fifth aspect of the invention, there is provided a computer readable medium having stored thereon, a sequence of instructions which when executing by a processing system, cause the processing system to perform a method for scaling down a Bayer domain image made up of a number of 2×2 basic units, each having a Red (R) pixel, a Blue (B) pixel, and two green (G) pixels arranged in a fixed configuration and replicated throughout the image, the method comprising (a) partitioning the image into 2M×2N input blocks, where M and N are integers greater than or equal to 1; (b) for each 2M×2N input block, averaging a selection of R pixels in the block to produce a R pixel in a scaled down image corresponding to the Bayer domain image; (c) averaging a selection of B pixels in the block to produce a B pixel in the scaled down image; and (d) partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

According to a sixth aspect of the invention, there is provided an image processor, comprising a central processing unit (CPU) core; and a scaling engine coupled to the CPU core, the scaling engine capable of performing a method of scaling down a Bayer domain image to produce a scaled down image comprising a repeating pattern of a 2×2 basic pixel block having four color pixels, the method comprising (a) defining an area of support in the Bayer domain input image for each color pixel of each 2×2 basic pixel block in the scaled down image, each area of support including pixels of the Bayer domain image that are spatially related to the color pixel; and (b) generating each color pixel for each 2×2 basic pixel block in the output image by averaging a selection of pixels of the Bayer domain image within the area of support for the color pixel.

According to a seventh aspect of the invention, there is provided an image processing system, comprising an image sensor; and an image processor to process data from the image sensor, the image processor comprising a central processing unit (CPU) core; and a scaling engine coupled to the CPU core, the scaling engine capable of performing a method for processing a Bayer domain image to produce a scaled down image comprising a repeating pattern of a 2×2 basic pixel block having four color pixels, the method comprising (a) defining an area of support in the Bayer domain input image for each color pixel of each 2×2 basic pixel block in the scaled down image, each area of support including pixels of the Bayer domain image that are spatially related to the color pixel; and (b) generating each color pixel for each 2×2 basic pixel block in the output image by averaging a selection of pixels of the Bayer domain image within the area of support for the color pixel.

According to an eighth aspect of the invention, there is provided a computer readable medium having stored thereon, a sequence of instructions which when executing by a processing system, cause the processing system to perform a method for processing a Bayer domain image to produce a scaled down image comprising a repeating pattern of a 2×2 basic pixel block having four color pixels, the method comprising (a) defining an area of support in a Bayer domain input image for each color pixel of each 2×2 basic pixel block in the scaled down image, each area of support including pixels of the Bayer domain image that are spatially related to the color pixel; and (b) generating each color pixel for each 2×2 basic pixel block in the output image by averaging a selection of pixels of the Bayer domain image within the area of support for the color pixel.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which:

FIG. 1 shows a color filter array;

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 4:
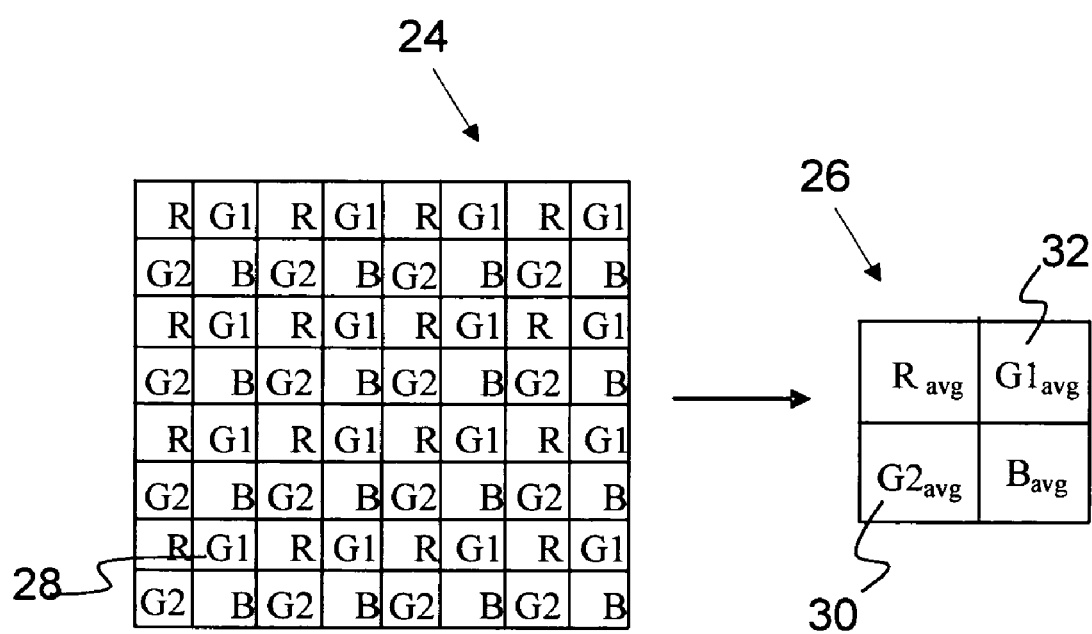
FIG. 4 shows an example of down scaling by a factor of four horizontally and vertically using linear filtering.

In one embodiment of the invention, a decimation technique for scaling down a Bayer domain image is provided. In accordance with this technique, and referring to FIG. 4 of the drawings, the G1 pixel 28 is considered in the weighted average for the output $G2_{avg}$ pixel 30 instead of for the output $G1_{avg}$ pixel 32.

Figure 5:
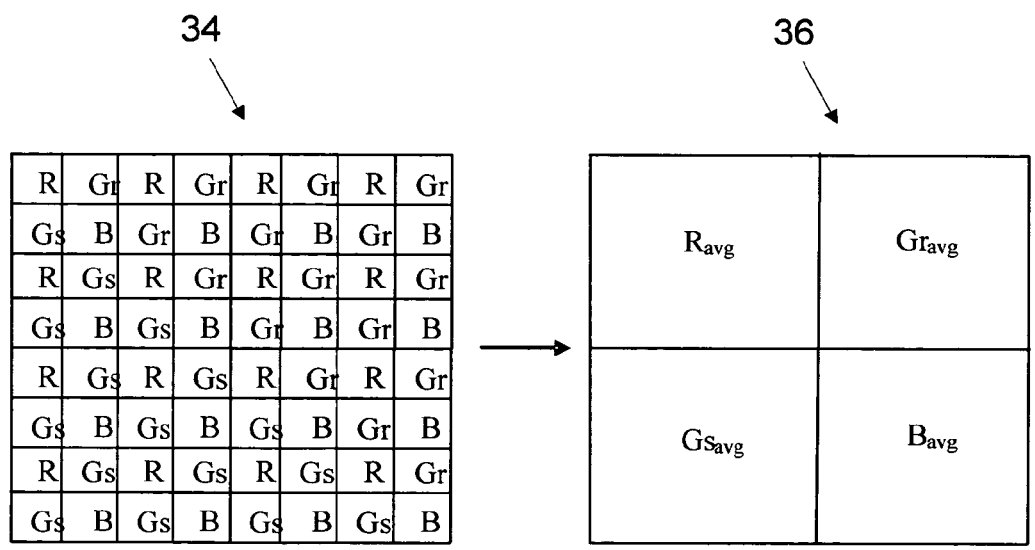
FIG. 5 shows an example of a down scaling method for Bayer domain imaging using averaging in a triangular region of support in, accordance with one embodiment of the invention.
Figure 6:
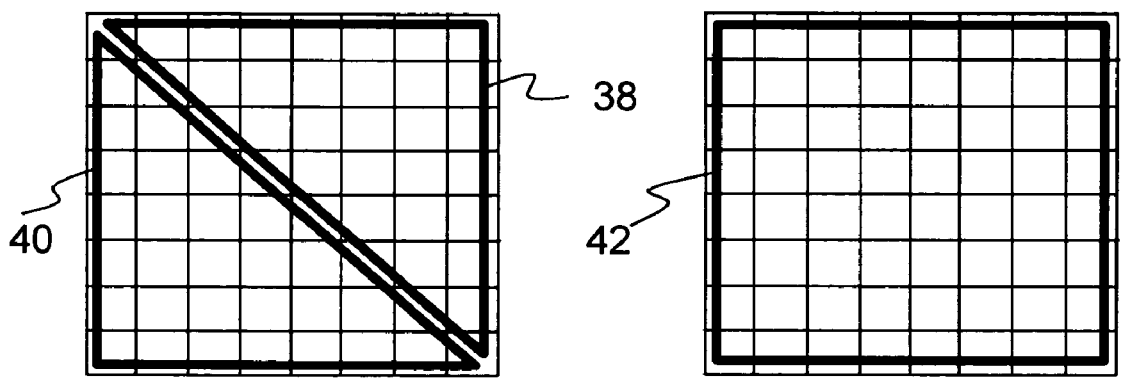
FIG. 6 shows the regions of support corresponding to R, Gr, Gs, and B pixels.

FIG. 5 of the drawings illustrates a first embodiment of the decimation technique. Referring to FIG. 5, a tile or block 34 of $2^{K+1}$ and $2^{L+1}$ Bayer domain pixels is scaled down into a 2×2 basic unit 36 of pixels. In FIG. 5, the green pixels have been re-labeled to Gr and Gs to indicate that the weighted averaging process selects the green pixels following a triangular region of support. In this embodiment, all the Gr pixels included in the weighted average for $Gr_{avg}$ are spatially closer to the output $Gr_{avg}$ location than to the $Gs_{avg}$ location, and vice versa. FIG. 6 shows the regions of support corresponding to the R, Gr, Gs, and B pixels in the Bayer domain input image. In FIG. 6, the thick lines indicate the regions of support, whereas the thin lines indicate the pixel structure of the original or input image. As will be seen, a triangle 38 defines the region of support for $Gr_{avg}$, and a triangle 40 defines the region of support for $Gs_{avg}$, whereas a rectangular region 42 defines the region for support for the R and B pixels. Note that FIG. 6 provides only an indication of the general shape of the regions of support. In accordance with other embodiments, it is possible to extend the region so that there is overlapping of pixels in the neighboring regions.

Figure 7:
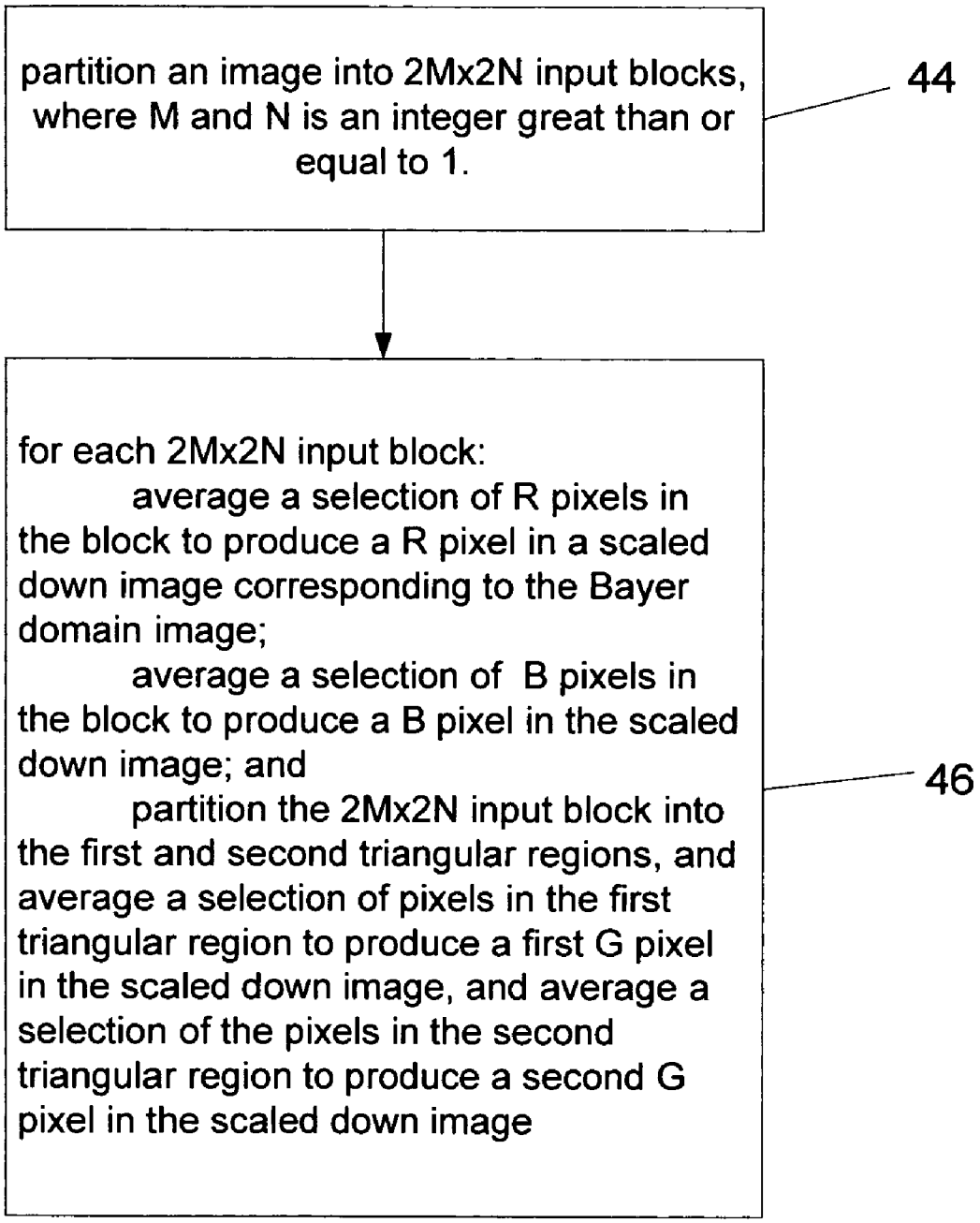
FIG. 7 shows a flowchart of a method for processing a Bayer domain image to produce a scaled down image, in accordance with one embodiment of the invention.

The first embodiment is thus a method for scaling down a Bayer domain image made up of a number of 2×2 basic units, each having a Red (R) pixel, a Blue (B) pixel, and two green (G) pixels arranged in a fixed configuration and replicated throughout the image. The first embodiment may be algorithmically represented by the flowchart of FIG. 7. Referring to FIG. 7, the first embodiment includes an operation 44 wherein a Bayer domain input image is partitioned into 2M×2N input blocks (M, N are integers $\geq 1$). Thereafter, operation 46 is performed for each 2M×2N input block. Operation 46 includes (a) averaging a selection of R pixels in the block to produce a R pixel in a scaled down image corresponding to the Bayer domain image; (b) averaging a selection of B pixels in the block to produce a B pixel in the scaled down image; and partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

Figure 2:
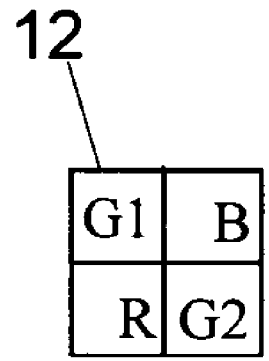
FIG. 2 shows configurations of 2×2 base pixel blocks.
Figure 2:
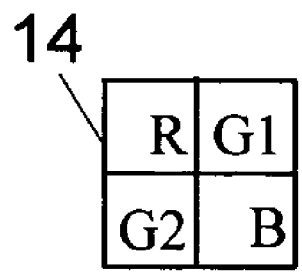
Figure 2:
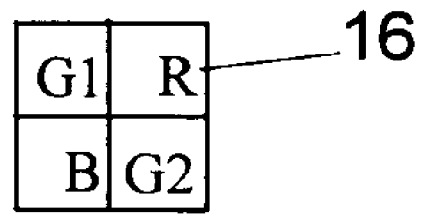
Figure 2:
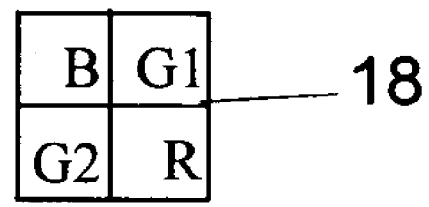
Figure 3:
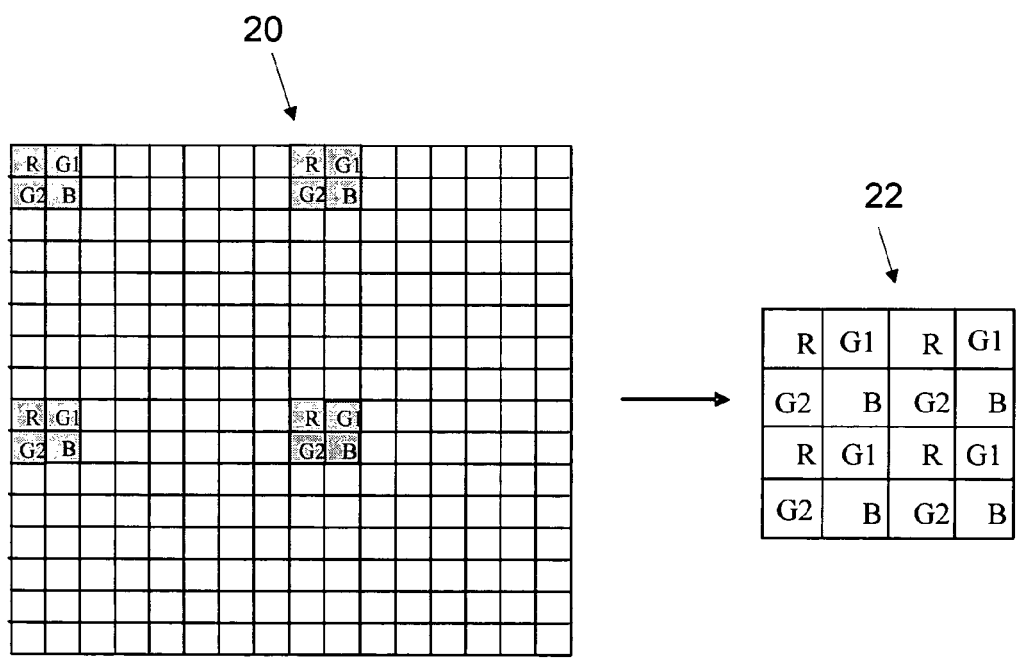
FIG. 3 shows an example of decimation by a factor of four horizontally and vertically.

As described above, the Bayer domain input image is made up of one of the basic units shown in FIG. 2, repeated throughout the image. If the basic units 14 or 18 make up the Bayer domain input image, then the first and second triangles are formed so that a hypotenuse of each of the triangles runs from a top left hand corner for the 2M×2N input block to a bottom right hand corner of the 2M×2N input block. In other words, the triangles are oriented like the triangles 38 and 40 of FIG. 6.

For a Bayer domain input image made up of basic units 12 or 16, the first and second triangles are oriented such that the hypotenuse of each of the triangles runs from a bottom left hand corner for the 2M×2N input block to a top right hand corner of the 2M×2N input block.

The first embodiment of the decimation technique as shown in FIGS. 5 and 6 is self contained in the sense that a tile of $2^{K+1}$ and $2^{L+1}$ pixels is all that is necessary to produce the 2×2 output unit, and hence each tile of input pixels can be processed independently of each other.

In a second embodiment of the decimation technique, the requirement that each output 2×2 unit can only depend on the input pixels within a tile of $2^{K+1}$ and $2^{L+1}$ input Bayer domain pixels is relaxed.

Figure 8:
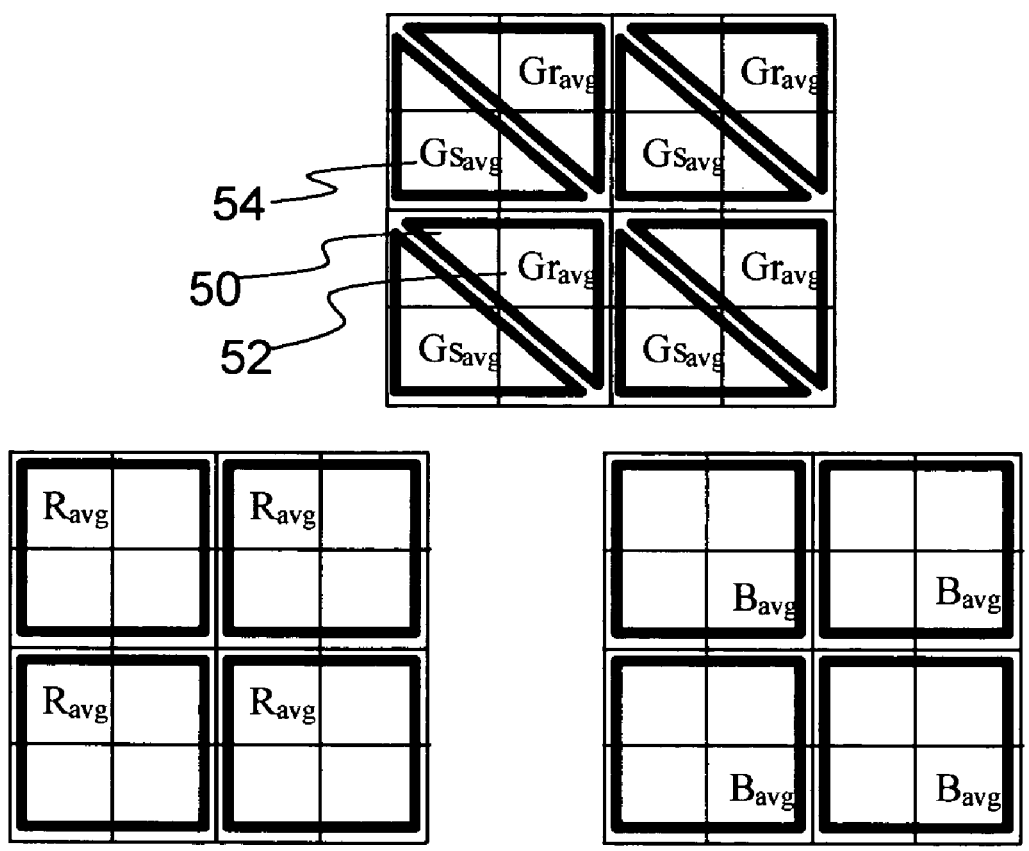
FIG. 8 shows the regions of support for the R, Gr, Gs and B pixels in a scaling down technique.

Before describing the second embodiment, consider FIG. 8 of the drawings which shows the regions of support for the R, Gr, Gs, and B pixels in the scaling down technique of the first embodiment. In FIG. 8, the thick lines show the regions of support for the R, Gr, Gs, and B pixels, whereas the thin lines show the pixel structure of the output scaled down image.

Because the output image is scaled down by a factor of $2^K \times 2^L$, each pixel of the scaled down output image such as 52 and 54 corresponds to $2^{K+L}$ pixels in the Bayer domain input image. It will be observed that the pixels at location 50 in the input image, which is near the upper left corner of the triangular region of support for the output location 52, are spatially closer to the output pixel $Gs_{avg}$ at location 54 than the output pixel $Gr_{avg}$ at location 52. Thus, it would be better if the input pixels at location 50 are included in the weighted average for $Gs_{avg}$ at location 54 instead of $Gr_{avg}$ at location 52. Some original input image pixels within the regions of support in the $R_{avg}$ and $B_{avg}$ output pixels exhibit a similar problem.

Figure 9:
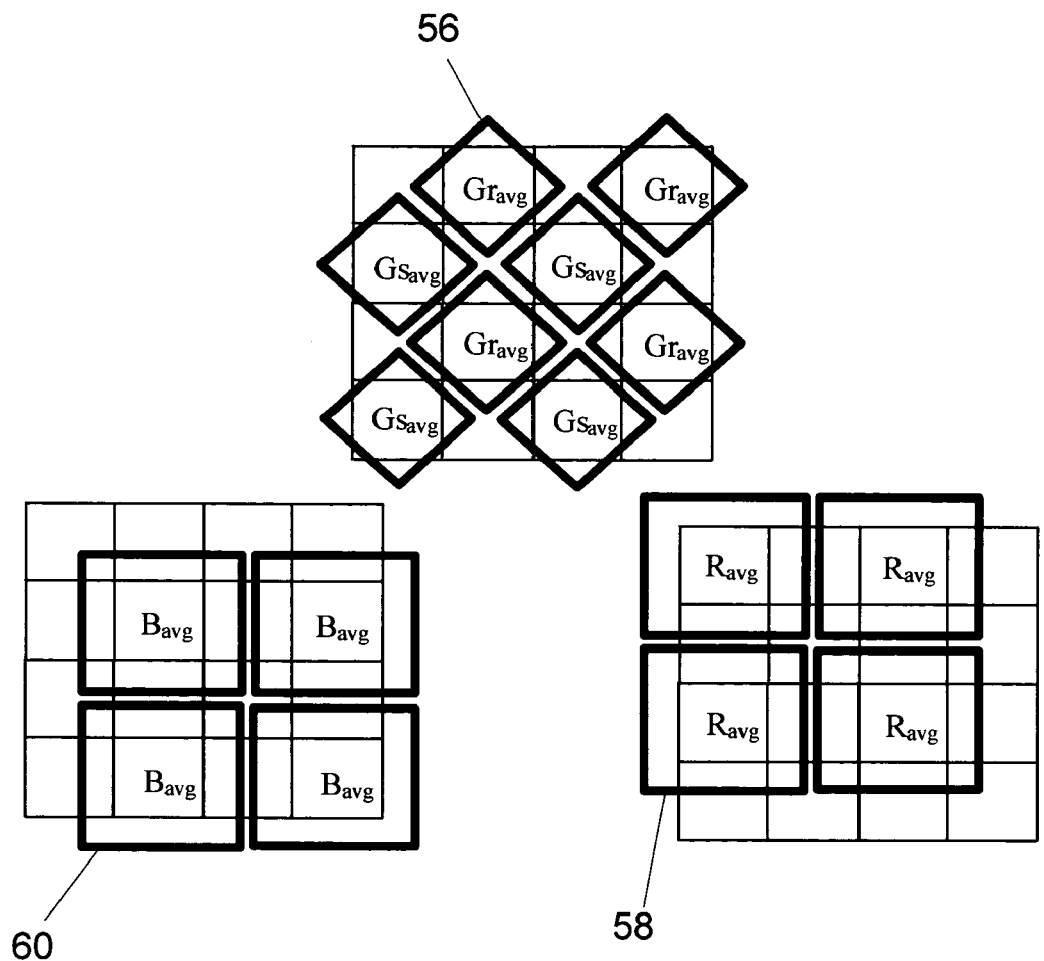
FIG. 9 shows additional examples of regions of support for R, Gr, Gs and B pixels in a scaling technique.

Given the above observation, in the second embodiment of the decimation technique, the regions of support in the Bayer domain input image for each pixel in the output image is modified and are as indicated in FIG. 9 of the drawings. Referring to FIG. 9, as before, the thick lines show the region of support in the Bayer domain input image for the down scaling in the Bayer domain, whereas the thin lines show the pixel structure of the output scaled down image. It will be seen that the weighted average of a selection of input green pixels within each diamond-shaped region 56 is calculated to give a green pixel of the down scaled image. The regions of support in the Bayer domain input image for the R, and B pixels in the output image are indicated by reference numerals 58, and 60, respectively. Using the regions of support as shown in FIG. 9, it is guaranteed that each output pixel in the scaled-down image is computed from a set of pixels in the input Bayer image that are of the same color and are spatially closest to the output pixel, taking into account the scaling factor.

Figure 10:
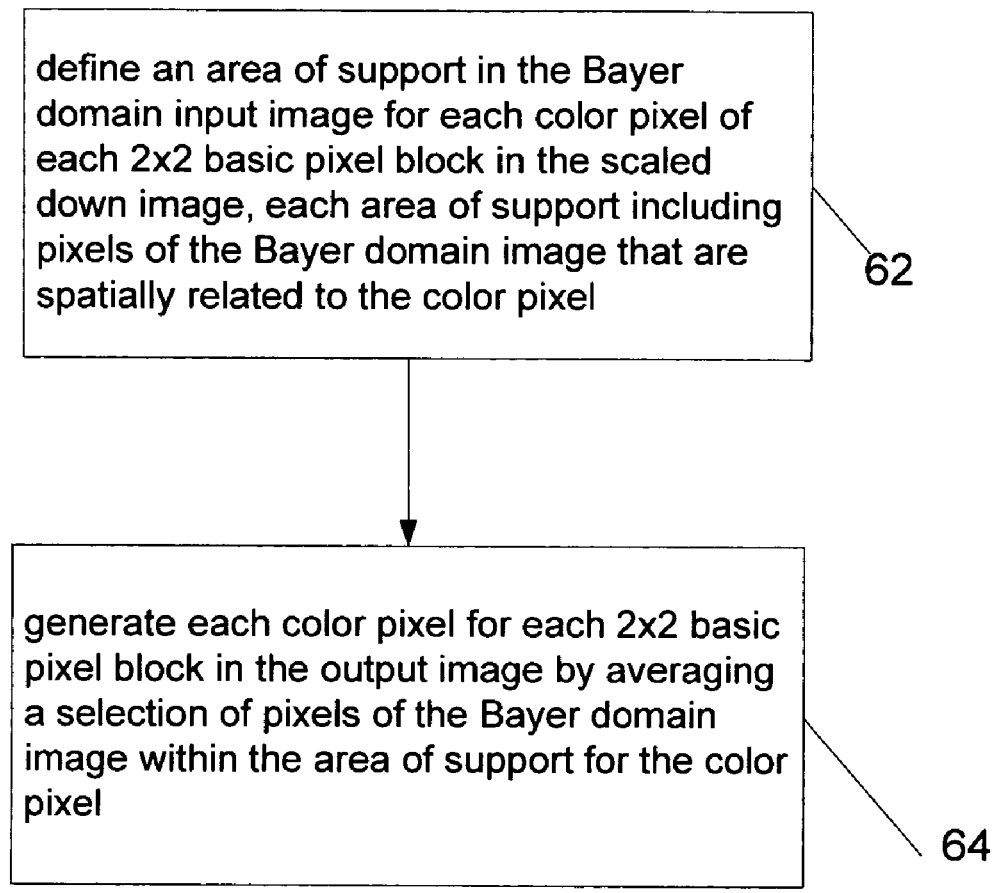
FIG. 10 shows a flowchart of a method for processing a Bayer domain image to produce a scaled down image, in accordance with one embodiment of the invention.

The second embodiment is thus a method for processing a Bayer domain image to produce a scaled down image comprising a repeating pattern of a 2×2 basic pixel block having four color pixels. The second embodiment may be algorithmically represented by the flowchart of FIG. 10. Referring to FIG. 10, the second embodiment includes an operation 62 which includes defining an area of support in the Bayer domain input image for each color pixel of each 2×2 basic pixel block in the scaled down image such that each area of support including pixels of the Bayer domain image that are spatially related to the output color pixel. The operation 62 is followed by an operation 64 which includes generating each color pixel for each 2×2 basic pixel block in the output image by averaging a selection of pixels of the Bayer domain image within the area of support for the color pixel. For the R and B pixels in the 2×2 basic pixel block the area of support in the Bayer domain input image is rectangular and contains pixels that are spatially close to the R, or G pixels in the output image, as the case may be. For the G pixel in each 2×2 pixel block in the output image the area of support in the Bayer domain input image is diamond-shaped and contains pixels that are spatially close to the G pixel.

The techniques disclosed herein may be implemented in hardware, software, or a combination of both hardware and software. The hardware may be general purpose hardware containing special code to perform the techniques. Alternatively, the hardware may be a special purpose image processor implemented in silicon.

Figure 11:
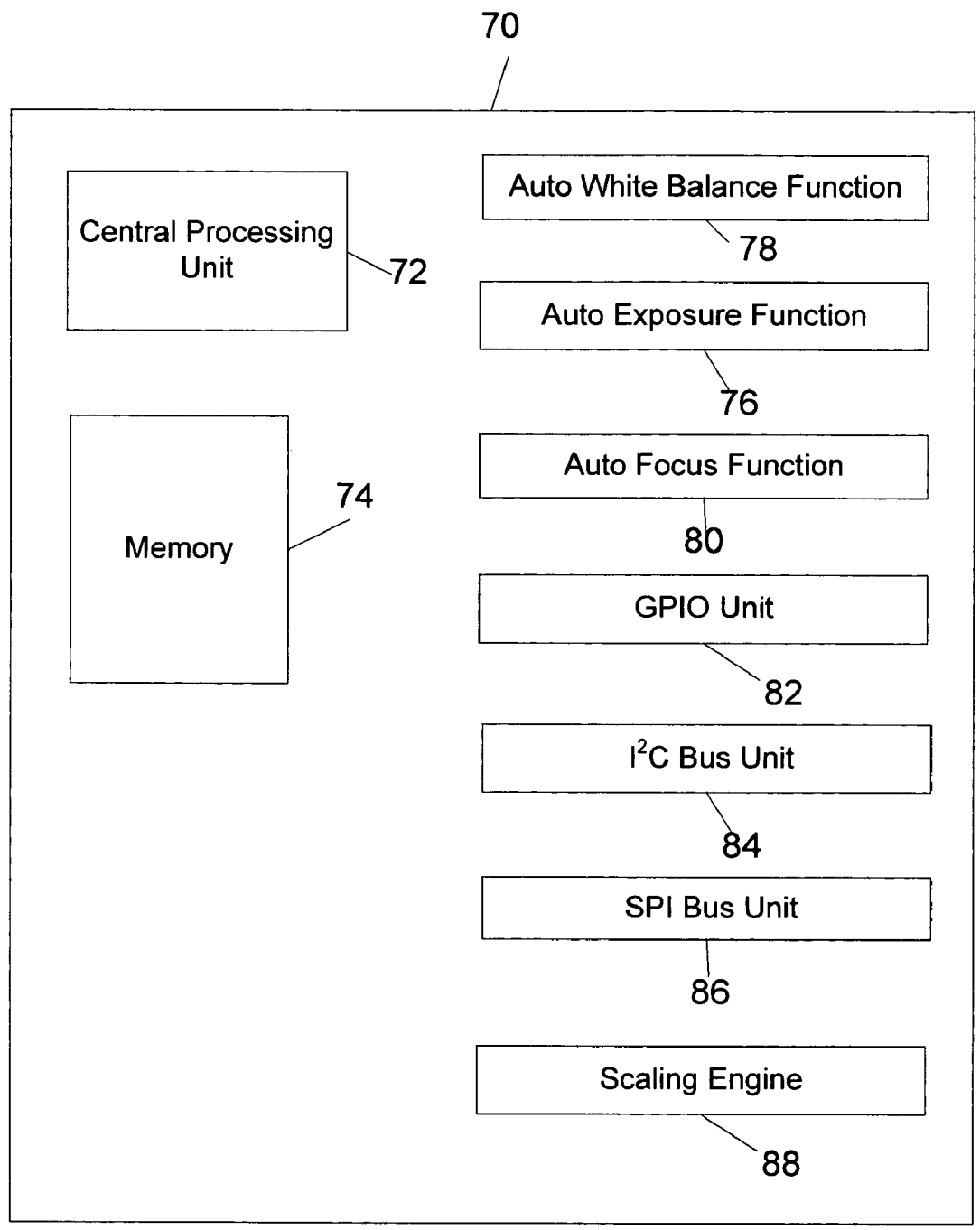
FIG. 11 shows a schematic block diagram of a special purpose image processor, in accordance with one embodiment of the invention.

As an example of special purpose hardware, consider the image processor 70 of FIG. 11. The image processor 70 may be implemented in silicon and includes a central processing unit (CPU) core 72 which is coupled to a memory subsystem 74. The image processor 70 also includes known image processing functions such as an auto exposure function 76, an auto white balance function 78, an auto focus function 80, etc. For input and output (I/O), the image processor may include a General Purpose Input/Output (GPIO) unit 82. To facilitate data transfer, the image processor 70 may implement several bus technologies. In the example shown, the image processor 70 includes a serial computer bus ($I^2C$) unit 84, and Serial Peripheral Bus (SPI) unit 86. To perform the scaling techniques described above, the image processor 70 includes a scaling engine 88. In one embodiment, the scaling engine 88 may be realized as a hardware scaling circuit. In another embodiment, the scaling engine 88 may be realized in code, e.g. microcode, stored in a Read-Only-Memory (ROM) unit of the memory subsystem 74.

Figure 12:
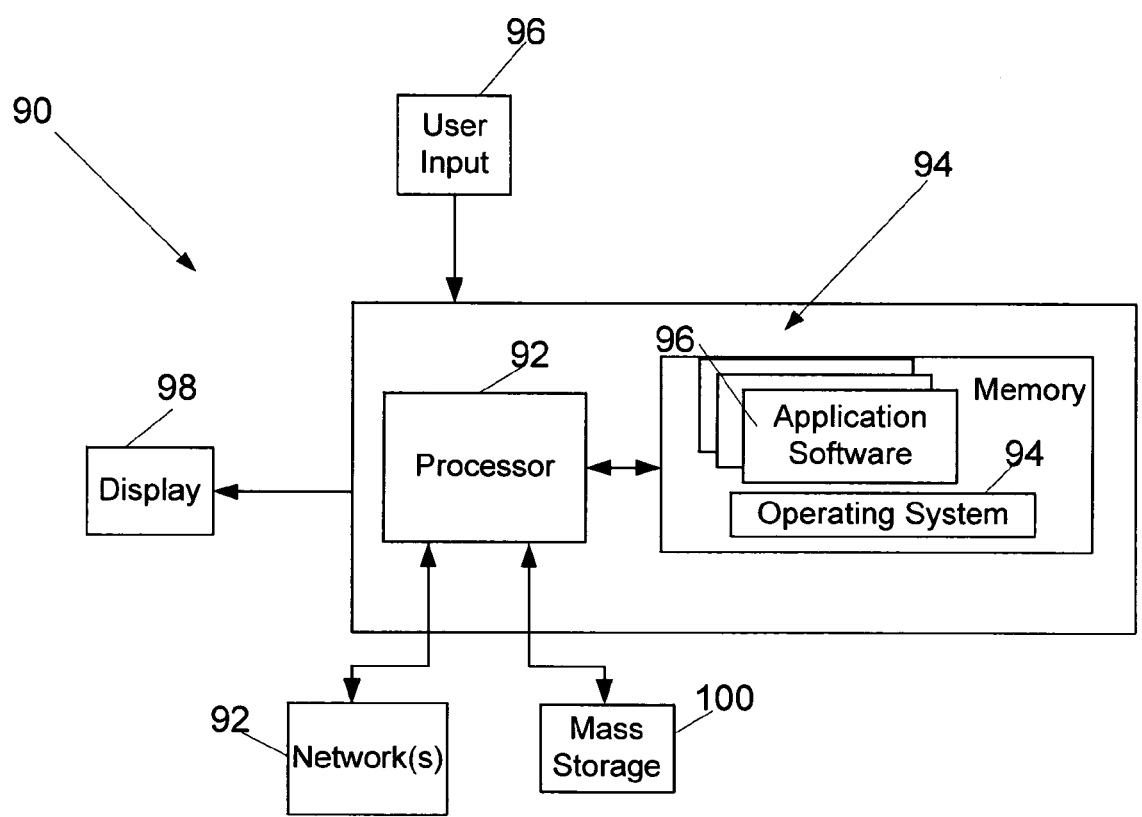
FIG. 12 shows a schematic block diagram of hardware that may be used to implement the embodiments of the invention.

FIG. 12 of the drawings, shows an example of general purpose hardware 90 that may be used to perform the scaling techniques disclosed herein. The hardware 90 typically includes at least one processor 92 coupled to a memory 94. The processor 92 may represent one or more processors (e.g., microprocessors), and the memory 94 may represent random access memory (RAM) devices comprising a main storage of the hardware 90, as well as any supplemental levels of memory e.g., cache memories, non-volatile or back-up memories (e.g. programmable or flash memories), read-only memories, etc. In addition, the memory 94 may be considered to include memory storage physically located elsewhere in the hardware 90, e.g. any cache memory in the processor 92, as well as any storage capacity used as a virtual memory, e.g., as stored on a mass storage device 100.

The hardware 90 also typically receives a number of inputs and outputs for communicating information externally. For interface with a user or operator, the hardware 90 may include one or more user input devices 96 (e.g., a keyboard, a mouse, etc.) and a display 98 (e.g., a Cathode Ray Tube (CRT) monitor, a Liquid Crystal Display (LCD) panel).

For additional storage, the hardware 90 may also include one or more mass storage devices 90, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 90 may include an interface with one or more networks 92 (e.g., a local area network (LAN), a wide area network (WAN), a wireless network, and/or the Internet among others) to permit the communication of information with other computers coupled to the networks. It should be appreciated that the hardware 90 typically includes suitable analog and/or digital interfaces between the processor 92 and each of the components 94, 96, 98 and 102 as is well known in the art.

The hardware 90 operates under the control of an operating system 94, and executes various computer software applications, components, programs, objects, modules, etc. (e.g. a program or module which performs operations described above) to perform other operations described with reference to FIGS. 1 through 11. Moreover, various applications, components, programs, objects, etc. may also execute on one or more processors in another computer coupled to the hardware 90 via a network 102, e.g. in a distributed computing environment, whereby the processing required to implement the functions of a computer program may be allocated to multiple computers over a network.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Figure 13:
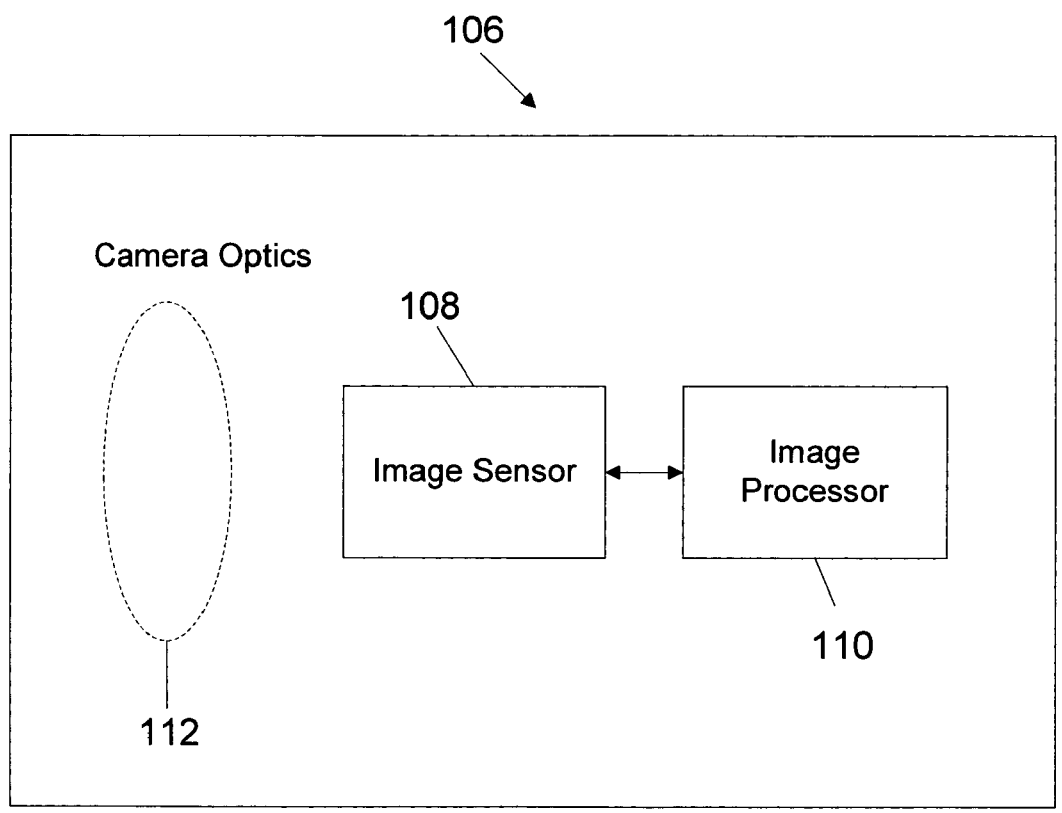
FIG. 13 shows a schematic block diagram of an image processing system, in accordance with an embodiment of the invention.

Embodiments of the present invention also cover image processing systems that include the image processor described above. One such image processing system 106 is shown in FIG. 13 of the drawings. Referring to FIG. 13, it will be seen that the image processing system 106 includes an image sensor 108 which is coupled to an image processor 110 which is of the same design as the image processor 70 of FIG. 11. In one embodiment, the image processing system 106 may be in the form of a digital camera, in which case it may include other components dictated by the function of the digital camera such camera optics 112.

Although the present invention has been described with reference to specific exemplary embodiments, it will be evident that the various modifications and changes can be made to these embodiments without departing from the broader spirit of the invention as set forth in the claims. Accordingly, the specification and drawings are to be regarded in an illustrative sense rather than in a restrictive sense.

The invention claimed is:

1. A method for scaling down a Bayer domain image made up of a number of 2×2 basic units, each having a Red (R) pixel, a Blue (B) pixel, and two green (G) pixels arranged in a fixed configuration and replicated throughout the image, the method performed by a scaling engine coupled to a central processing unit, the method comprising:
    partitioning the image into 2M×2N input blocks, where M and N are integers greater than or equal to 1
    for each 2M×2N input block,
        averaging a selection of R pixels in the block to produce a R pixel in a scaled down image corresponding to the Bayer domain image;
        averaging a selection of B pixels in the block to produce a B pixel in the scaled down image; and
        partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

2. The method of claim 1, wherein the fixed configuration comprises one of the following pixel configurations:
    (a) a 2×2 block with the upper left corner containing an R pixel, the upper right corner containing a G pixel, the lower left corner containing a G pixel, and the lower right corner containing a B pixel; or
    (b) a 2×2 block with the upper left corner containing a B pixel, the upper right corner containing a G pixel, the lower left corner containing a G pixel, and the lower right corner containing an R pixel;
    in which case the first and second triangles are formed so that an hypotenuse of each of the triangles run from a top left hand corner of the 2M×2N input block to a bottom right hand corner of the 2M×2N input block.

3. The method of claim 1, wherein the fixed configuration comprises one of the following pixel configurations:
    (a) a 2×2 block with the upper left corner containing an G pixel, the upper right corner containing a R pixel, the lower left corner containing a B pixel, and the lower right corner containing a G pixel; or
    (b) a 2×2 block with the upper left corner containing a G pixel, the upper right corner containing a B pixel, the lower left corner containing a R pixel, and the lower right corner containing an G pixel;
    in which case the first and second triangles are formed so that an hypotenuse of each of the triangles run from a bottom left hand corner of the 2M×2N input block to a top right hand corner of the 2M×2N input block.

4. A method for processing a Bayer domain image to produce a scaled down image comprising a repeating pattern of a 2×2 basic pixel block having four color pixels, the method performed by a scaling engine coupled to a central processing unit, the method comprising:
    defining an area of support comprising first and second triangular regions in the Bayer domain input image for each color pixel of each 2×2 basic pixel block in the scaled down image, each area of support including pixels of the Bayer domain image that are spatially related to the color pixel; and
    generating each color pixel for each 2×2 basic pixel block in the output image by averaging a selection of pixels of the Bayer domain image within the area of support for the color pixel.

5. The method of claim 4, wherein defining the area of support for each G pixel in the 2×2 basic pixel block comprises selecting a diamond shaped area of the Bayer domain image containing pixels that are spatially close to the G pixel.

6. The method of claim 4, wherein the 2×2 basic pixel block comprises a Red (R) pixel, a Blue (B) pixel, and two Green (G) pixels in one of the following pixel configurations:
    (a) a 2×2 block with the upper left corner containing an R pixel, the upper right corner containing a G pixel, the lower left corner containing a G pixel, and the lower right corner containing a B pixel; or
    (b) a 2×2 block with the upper left corner containing a G pixel, the upper right corner containing a R pixel, the lower left corner containing a B pixel, and the lower right corner containing an G pixel;
    (c) a 2×2 block with the upper left corner containing an B pixel, the upper right corner containing a G pixel, the lower left corner containing a G pixel, and the lower right corner containing a R pixel; or
    (d) a 2×2 block with the upper left corner containing a G pixel, the upper right corner containing a B pixel, the lower left corner containing a R pixel, and the lower right corner containing an G pixel;
    wherein defining the area of support for the R and B pixels in the 2×2 basic pixel block comprises selecting a rectangular area of the Bayer domain image containing pixels that are spatially close to the R and B pixels, respectively.

7. An image processor, comprising:
    a central processing unit (CPU) core; and
    a scaling engine coupled to the CPU core, the scaling engine capable of performing a method of scaling down a Bayer domain image made up of a number of 2×2 basic units, each having a Red (R) pixel, a Blue (B) pixel, and two green (C) pixels arranged in a fixed configuration and replicated throughout the image, the method comprising:

partitioning the image into 2M×2N input blocks, where M and N are integers greater than or equal to 1;

for each 2M×2N input block, averaging a selection of R pixels in the block to produce a R pixel in a scaled down image corresponding to the Bayer domain image;

averaging a selection of B pixels in the block to produce a B pixel in the scaled down image; and partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

8. The image processor of claim 7, wherein the fixed configuration comprises one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a B pixel, the upper right corner containing a G pixel, the lower left corner containing a G pixel, and the lower right corner containing an R pixel;

in which case the first and second triangles are formed so that an hypotenuse of each of the triangles run from a top left hand corner of the 2M×2N input block to a bottom right hand corner of the 2M×2N input block.

9. The image processor of claim 7, wherein the fixed configuration comprises one of the following pixel configurations:

(a) a 2×2 block with the upper left corner containing an G pixel, the upper right corner containing a R pixel, the lower left corner containing a B pixel and the lower right corner containing a G pixel; or (b) a 2×2 block with the upper left corner containing a G pixel, the upper right corner containing a B pixel, the lower left corner containing a R pixel, and the lower right corner containing a G pixel;

in which case the first and second triangles are formed so that an hypotenuse of each of the triangles run from a bottom left hand corner of the 2M×2N input block to a top right hand corner of the 2M×2N input block.

10. An image processing system, comprising:

an image sensor; and an image processor to process data from the image sensor, the image processor comprising a central processing unit (CPU) core; and a scaling engine coupled to the CPU core, the scaling engine capable of performing a method of scaling down a Bayer domain image made up of a number of 2×basic units, each having a Red (R) pixel, a Blue (B) pixel, and two green (G) pixels arranged in a fixed configuration and replicated throughout the image, the method comprising:

partitioning the image into 2M×2N input blocks, where M and N are integers greater than or equal to 1;

for each 2M×2N input block, averaging a selection of R pixels in the block to produce a R pixel in a scaled down image corresponding to the Bayer domain image;

averaging a selection of B pixels in the block to produce a B pixel in the scaled down image; and partitioning the 2M×2N input block into first and second triangular regions, and averaging a selection of pixels in the first triangular region to produce a first G pixel in the scaled down image, and averaging a selection of pixels in the second triangular region to produce a second G pixel in the scaled down image.

11. The image processing system of claim 10, wherein the fixed configuration comprises one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a B pixel, the upper right corner containing a G pixel, the lower left corner containing a G pixel, and the lower right corner containing an R pixel;

in which case the first and second triangles are formed so that an hypotenuse of each of the triangles run from a top left hand corner of the 2M×2N input block to a bottom right hand corner of the 2M×2N input block.

12. The image processing system of claim 10, wherein the fixed configuration comprises one of the following pixel configurations:

(a) a 2×2 block with the upper left corner containing an G pixel, the upper right corner containing a R pixel, the lower left corner containing a B pixel, and the lower right corner containing a G pixel; or (b) a 2×2 block with the upper left corner containing a G pixel, the upper right corner containing a B pixel, the lower left corner containing a R pixel, and the lower right corner containing a G pixel;

in which case the first and second triangles are formed so that an hypotenuse of each of the triangles run from a bottom left hand corner of the 2M×2N input block to a top right hand corner of the 2M×2N input block.

13. A computer readable recordable type medium having stored thereon, a sequence of instructions which when executing by a processing system, cause the processing system to perform a method for scaling down a Bayer domain image made up of a number of 2×2 basic units, each having a Red (R) pixel, a Blue (B) pixel, and two green (G) pixels arranged in a fixed configuration and replicated throughout the image, the method comprising:

partitioning the image into 2M×2N input blocks, where M and N are integers greater than or equal to 1;

for each 2M×2N input block, averaging a selection of R pixels in the block to produce a R pixel in a scaled down image corresponding to the Bayer domain image;

averaging a selection of B pixels in the block to produce a B pixel in the scaled down image; and partitioning the 2N×2N input block into first and second triangular regions, and averaging a selection of pixels in the first triangular region to produce a first G pixel in the scaled down image, and averaging a selection of pixels in the second triangular region to produce a second G pixel in the scaled down image.

14. The computer readable recordable type medium of claim 13, wherein the fixed configuration comprises one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a B pixel, the upper right corner containing a G pixel, the lower left corner containing a G pixel, and the lower right corner containing an R pixel;

in which case the first and second triangles are formed so that an hypotenuse of each of the triangles run from a top left hand corner of the 2M×2N input block to a bottom right hand corner of the 2M×2N input block.

15. The computer readable recordable type medium of claim 13, wherein the fixed configuration comprises one of the following pixel configurations:

(a) a 2×2 block with the upper left corner containing an G pixel, the upper right corner containing a R pixel, the lower left corner containing a B pixel, and the lower right corner containing a G pixel; or (b) a 2×2 block with the upper left corner containing a G pixel, the upper right corner containing a B pixel, the lower left corner containing a R pixel, and the lower right corner containing a G pixel;

in which case the first and second triangles are formed so that an hypotenuse of each of the triangles run from a bottom left hand corner of the 2M×2N input block to a top right hand corner of the 2M×2N input block.

16. An image processor, comprising:

a central processing unit (CPU) core; and a scaling engine coupled to the CPU core, the scaling engine capable of performing a method of scaling down a Bayer domain image to produce a scaled down image comprising a repeating pattern of a 2×2 basic pixel block having four color pixels, the method comprising:

defining an area of support comprising first and second triangular regions in the Bayer domain input image for each color pixel of each 2×2 basic pixel block in the scaled down image, each area of support including pixels of the Bayer domain image that are spatially related to the color pixel; and generating each color pixel for each 2×2 basic pixel block in the output image by averaging a selection of pixels of the Bayer domain image within the area of support for the color pixel.

17. The image processor of claim 16, wherein defining the area of support for each G pixel in the 2×2 basic pixel block comprises selecting a diamond shaped area of the Bayer domain image containing pixels that are spatially close to the G pixel.

18. The image processor of claim 16, wherein the 2×2 basic pixel block comprises a Red (R) pixel, a Blue (B) pixel, and two Green (G) pixels in one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a G pixel, the upper right corner containing a R pixel, the lower left corner containing a B pixel, and the lower right corner containing an G pixel;

(c) a 2×2 block with the upper left corner containing an B pixel, the upper right corner containing a G pixel, the lower left corner containing a G pixel, and the lower right corner containing a R pixel; or (d) a 2×2 block with the upper left corner containing a G pixel, the upper right corner containing a B pixel, the lower left corner containing a R pixel, and the lower right corner containing an G pixel;

wherein defining the area of support for the R and B pixels in the 2×2 basic pixel block comprises selecting a rectangular area of the Bayer domain image containing pixels that are spatially close to the R and B pixels, respectively.

19. An image processing system, comprising:

an image sensor; and an image processor to process data from the image sensor, the image processor comprising a central processing unit (CPU) core; and a scaling engine coupled to the CPU core, the scaling engine capable of performing a method for processing a Bayer domain image to produce a scaled down image comprising a repeating pattern of a 2×2 basic pixel block having four color pixels, the method comprising:

defining an area of support comprising first and second triangular regions in the Bayer domain input image for each color pixel of each 2×2 basic pixel block in the scaled down image, each area of support including pixels of the Bayer domain image that are spatially related to the color pixel; and generating each color pixel for each 2×2 basic pixel block in the output image by averaging a selection of pixels of the Bayer domain image within the area of support for the color pixel.

20. The image processing system of claim 19, wherein defining the area of support for each G pixel in the 2×2 basic pixel block comprises selecting a diamond shaped area of the Bayer domain image containing pixels that are spatially close to the G pixel.

21. The image processing system of claim 19, wherein the 2×2 basic pixel block comprises a Red (R) pixel, a Blue (B) pixel, and two Green (G) pixels in one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a G pixel, the upper right corner containing a R pixel, the lower left corner containing a B pixel, and the lower right corner containing an G pixel;

(c) a 2×2 block with the upper left corner containing an B pixel, the upper right corner containing a G pixel, the lower left corner containing a G pixel, and the lower right corner containing a R pixel; or (d) a 2×2 block with the upper left corner containing a G pixel, the upper right corner containing a B pixel, the lower left corner containing a R pixel, and the lower right corner containing an G pixel;

wherein defining the area of support for the R and B pixels in the 2×2 basic pixel block comprises selecting a rectangular area of the Bayer domain image containing pixels that are spatially close to the R and B pixels, respectively.

22. A computer readable recordable type medium having stored thereon, a sequence of instructions which when executing by a processing system, cause the processing system to perform a method for processing a Bayer domain image to produce a scaled down image comprising a repeating pattern of a 2×2 basic pixel block having four color pixels, the method comprising:

defining an area of support comprising first and second triangular regions in the Bayer domain input image for each color pixel of each 2×2 basic pixel block in the scaled down image, each area of support including pixels of the Bayer domain image that are spatially related to the color pixel; and generating each color pixel for each 2×2 basic pixel block in the output image by averaging a selection of pixels of the Bayer domain image within the area of support for the color pixel.

23. The computer readable recordable type medium of claim 22, wherein defining the area of support for each G pixel in the 2×2 basic pixel block comprises selecting a diamond shaped area of the Bayer domain image containing pixels that are spatially close to the G pixel.

24. The computer readable recordable type medium of claim 22, wherein the 2×2 basic pixel block comprises a Red (R) pixel, a Blue (B) pixel, and two Green (G) pixels in one of the following pixel configurations:

(a) a 2×2 block with the upper left corner containing an R pixel, the upper right corner containing a G pixel, the lower left corner containing a G pixel, and the lower right corner containing a B pixel; or (b) a 2×2 block with the upper left corner containing a G pixel, the upper right corner containing a R pixel, the lower left corner containing a B pixel, and the lower right corner containing an G pixel;

(c) a 2×2 block with the upper left corner containing an B pixel, the upper right corner containing a G pixel, the lower left corner containing a G pixel, and the lower right corner containing a R pixel; or (d) a 2×2 block with the upper left corner containing a G pixel, the upper right corner containing a B pixel, the lower left corner containing a R pixel, and the lower right corner containing an G pixel;

wherein defining the area of support for the R and B pixels in the 2×2 basic pixel block comprises selecting a rectangular area of the Bayer domain image containing pixels that are spatially close to the R and B pixels, respectively.

* * * * *